(12) United States Patent
Gogoi

(10) Patent No.: US 11,853,288 B1
(45) Date of Patent: Dec. 26, 2023

(54) ENHANCED FILTER ACCURACY

(71) Applicant: Wells Fargo Bank, N.A., San Francisco, CA (US)

(72) Inventor: Asha Rani Gogoi, Bengaluru Karnataka (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/157,113

(22) Filed: Jan. 25, 2021

(51) Int. Cl.
*G06F 16/00* (2019.01)
*G06F 16/23* (2019.01)
(Continued)

(52) U.S. Cl.
CPC ...... *G06F 16/2365* (2019.01); *G06F 16/2237* (2019.01); *G06F 16/2255* (2019.01); *G06F 16/285* (2019.01)

(58) Field of Classification Search
CPC ..................... G06F 21/55; G06F 21/56; G06F 2009/45595; G06F 21/53; G06F 21/577; G06F 9/505; G06F 11/07; G06F 16/182; G06F 16/903; G06F 2009/45587; G06F 21/00; G06F 21/12; G06F 21/14; G06F 21/50; G06F 21/554; G06F 21/562; G06F 21/564; G06F 21/566; G06F 21/606; G06F 21/62; G06F 21/6209; G06F 21/6218; G06F 21/6245; G06F 21/6272; G06F 2221/2103; G06F 2221/2113; G06F 2221/2141; G06F 8/53; G06F 9/455; G06F 9/45558; G06F 21/44; G06F 21/73; G06F 16/9535; G06F 16/285; G06F 16/951; G06F 16/9566; G06F 21/552; G06F 16/9574; G06F 15/167; G06F 16/215; G06F 16/2246; G06F 16/235; G06F 16/24553; G06F 16/24566; G06F 16/9014; G06F 21/6263; H04L 2209/56; H04L 63/0471; H04L 63/0464; H04L 2209/34; H04L 9/0866; H04L 9/3278; H04L 2101/30; H04L 67/02; H04L 63/1416; H04L 63/1425; H04L 63/1433; H04L 63/0236; H04L 63/0263; H04L 67/1014;

(Continued)

(56) References Cited

U.S. PATENT DOCUMENTS 11,119,996 B2 * 9/2021 Gold ................... G06F 16/2237
2015/0356196 A1 * 12/2015 Sreenivas Prasad . G06F 16/285
707/740

(Continued)

*Primary Examiner* — Shyue Jiunn Hwa
(74) *Attorney, Agent, or Firm* — Kilpatrick Townsend & Stockton LLP

(57) ABSTRACT

Enhanced filter accuracy is disclosed with respect to determining whether a data element is present in a data store. The filter can correspond to a probabilistic filter with multiple levels. At each level after a representation of an original data element is captured in a data structure, a predetermined modification can be applied to the data element and a representation of the resulting modified data element can be captured in the data structure. In query operation, a check be performed for the presence or absence of an input data element and a number of modifications of the input data element, which results in a reduced false positive probability and improved accuracy. A multidimensional data structure can also be employed in conjunction with multiple levels to further improve accuracy.

20 Claims, 10 Drawing Sheets

(51) Int. Cl.
*G06F 16/28* (2019.01)
*G06F 16/22* (2019.01)

(58) Field of Classification Search
CPC ....... H04L 67/568; H04L 45/00; H04L 67/01; H04L 45/745; H04N 21/23106
See application file for complete search history.

(56) References Cited

U.S. PATENT DOCUMENTS

| | | | |
|---|---|---|---|
| 2018/0240032 A1* | 8/2018 | van Rooyen | G16B 20/20 |
| 2019/0318103 A1* | 10/2019 | Anton | G06F 12/1018 |
| 2020/0259793 A1* | 8/2020 | Pangeni | H04L 63/0263 |
| 2021/0056036 A1* | 2/2021 | Breslow | H03M 7/3088 |
| 2021/0157858 A1* | 5/2021 | Stevens | G06F 40/279 |
| 2021/0364318 A1* | 11/2021 | Rolf | G06F 16/24575 |

\* cited by examiner

ENHANCED FILTER ACCURACY

BACKGROUND

Over the years, exponential growth has been witnessed in the production and usage of data. This leads to a challenge with respect to finding efficient and fast solutions to search for data amongst enormous volumes of data. In one instance, a database can be accessed to determine whether a particular element is present in the database or not. Here, a search can be performed over the database to compare the particular element to all elements in the database. However, access time is proportional to the size of the database. This is problematic since as the database grows the access time will increase as well. Various attempts have been made to address this problem including hash tables and binary search algorithms. Nevertheless, such solutions introduce their own problems including at least costly memory requirements.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to enhanced filter accuracy associated with membership queries. Probabilistic filters, such as Bloom filters, are enhanced to reduce false positive probability and improve accuracy. Such filters can rely on hash functions to capture a representation of data elements and support queries. However, hashing collisions can occur that result in false positive results. Multiple levels are disclosed herein that include modified data elements that reduce hashing collisions, which reduces false positive probability and improves accuracy. A multidimensional data structure can also be employed in combination with multiple levels to further improve accuracy. Further, filter parameters such as number of levels and complexity of modification are adaptable based on context.

According to one aspect, a system is provided comprising a processor coupled to a memory that includes instructions that, when executed cause the processor to invoke at least one hash function with respect to a data element to produce a first hash of the data element, set a value in an array at an index specified by the first hash, apply a predetermined modification to the data element to produce a modified element, invoke the at least one hash function with respect to the modified element to produce a second hash of the modified element, and set a value in the array at an index specified by the second hash. The instructions further cause the processor to apply the predetermined modification to the modified element to produce a second modified element, invoke the at least one hash function with respect to the second modified element to produce a third hash of the second modified element, and set a value in the array at an index specified by the third hash. The instructions can also cause the processor to determine whether an input element is present or absent from a data store based on one or more values set in the array. Further, the instructions can cause the processor to invoke the at least one hash function with respect to the input element to produce a third hash, look up a value in the array with the third hash, wherein the third hash corresponds to an index and the value is either set or unset, and determine that the input element is absent from the data store when the value is unset. The instructions can further cause the processor to determine the input element is present in the data store when the value is set. In accordance with one aspect, the array is a multidimensional array. In one instance, the predetermined modification is a string manipulation operation such as concatenation of an alphanumeric character to the data element.

According to another aspect, a method is provided comprising receiving a data element as input and performing operations iteratively for a predetermined number of iterations or until the data element is deemed absent, wherein a modified data element acts as an initial data element for a next iteration. The operations comprise determining two or more hashes of a data element with different hash functions, looking up data values in an array with array indices specified by the two or more hashes, applying a predetermined modification to the data element producing the modified data element, classifying the data element as absent when any one of the data values is unset, and classifying the data element as present when all of the data values are set. The method further comprises returning a present or absent classification in response to receipt of the data element in which the classification pertains to whether the data element is present or absent from a data store of a financial institution. In one instance, receiving the data element comprises receiving an account username. Further, the method can comprise adding the account username to the data store of the financial institution in response to return of an absent classification. The method can also comprise looking up the data values in a multidimensional array. Further, the method can comprise applying a string manipulation operation as the predetermined modification and employing concatenation of an alphanumeric character to the data element as the string manipulation operation. In one instance, the method can further comprise setting the predetermined number of iterations based on context information regarding use of the classification. Furthermore, the method can comprise searching the data store for the data element when, after the predetermined number of iterations, the data element is classified as present and returning the present or absent classification based on whether the data store includes the data element.

In accordance with another aspect, a method comprises performing operations iteratively for a predetermined number of iterations, in which a modified data element acts as an initial data element for a next iteration. The operations comprise determining two or more hashes of a data element with different hash functions, wherein the data element corresponds to a unit of data stored on a data store of a financial institution, setting values of a bit array utilizing the two or more hashes as array indices, and applying a predetermined modification to the data element to produce the modified data element. The method further comprises setting the data values in a multidimensional bit array and applying a string manipulation operation as the predetermined modification.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
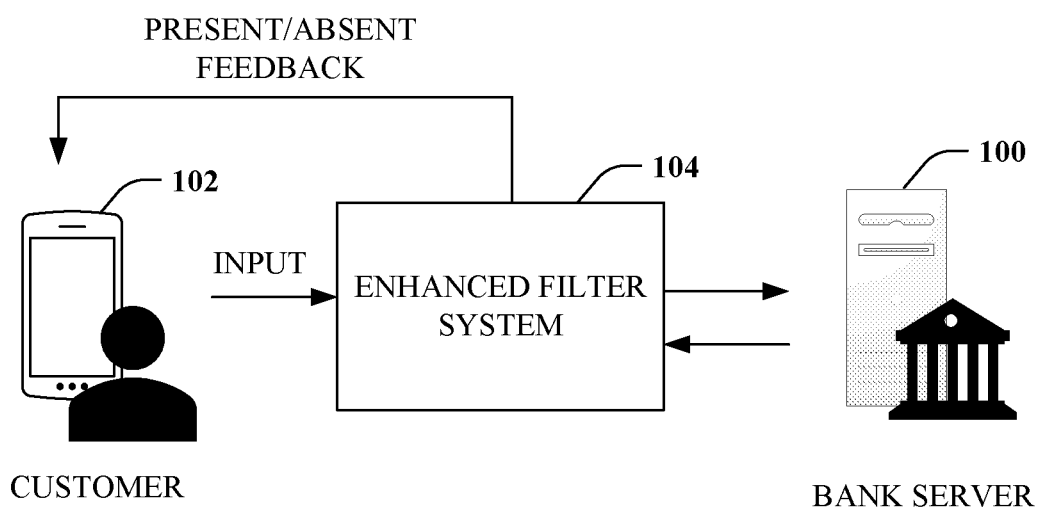
FIG. 1 illustrates an overview of an example implementation.

A Bloom filter (BF) was developed to address space and time issues of conventional techniques associated with determining whether or not an element is present in a data set. A BF is a probabilistic data structure that checks an elements presence in a given data set in constant time (e.g., O(1)) and relatively less space when compared with conventional methods as it does not store the data elements themselves. Internally, the BF is a bit array, hence the constant time access. When an element is added to the BF, some hash functions convert the element into a set of integers. These integers represent the indices of the bit array, and the bits at these indices are switch from an initial zero to one. A BF never supports a false negative, but it has little certainty for false positive. Stated differently, the BF can state with certainty when an element is absent from a data set. However, the BF cannot state with certainty that an element is present and is susceptible to a false positive. A BF is thus probabilistic with respect to determining that elements are present in a data set.

Probabilistic results may be acceptable in various situations. For example, consider use of a BF to track whether a product was suggested to a shopper. A false positive can correspond to determining that a product was already suggested when in fact it was not. As a result, a different product would be suggested with essentially no harm done. Nevertheless, the false positive rate associated with a BF can be determinative of performance of the BF. For example, the owner of the product that was mistakenly not suggested due to a BF false positive in the above example, would benefit from improved performance.

Details provided herein generally pertain to enhanced filter accuracy. Membership queries can benefit from the disclosed enhancement that mitigates the false positive probability associated with probabilistic filters, such as Bloom filters. An enhanced filter, or enhanced filter system, can be constructed that includes multiple levels with element modification to reduce hashing collisions, which reduces false positive probability and improves accuracy. The filter can also employ multiple dimensions to improve accuracy further. In addition, the filter is adaptable based on context. Filter parameters such as the number of levels and the complexity of the modification can be adjusted to account for context indicative of relative importance or unimportance of false positives.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a high-level overview of an example implementation is illustrated and described. As depicted, the implementation includes bank server 100, customer device 102, and enhanced filter system 104.

The bank server 100 is a computing device associated with a financial institution such as a bank. The bank server 100 is operable to provide or support a variety of services. Bank services can include mobile and online banking, acceptance of deposits, check payment, collection and payment of credit instruments, and remittance of funds, among other things.

The customer device 102 can correspond to substantially any public or private computing device accessible by a customer or potential customer of a financial institution, such as a bank. For example, the customer device 102 can correspond to a smart phone, tablet, automatic teller machine, or kiosk.

The enhanced filter system 104 is configured to facilitate membership queries, or the like, with respect to data stored on the bank server 100, or other database or data store associated with the bank server 100. In accordance with one embodiment, the enhanced filter system 104 can be separate from the bank server 100 or other data store, for example as part of a three tier architecture as shown here for clarity. Alternatively, in a two tier architecture, the enhanced filter system 104 can reside on the bank server 100, the customer device 102, or both the bank server 100 and the customer device 102.

The enhanced filter system 104 can correspond to a BF with accuracy enhancements. In other words, the enhanced filter system 104 can be a probabilistic data structure that can conclude with certainty when an element is absent but cannot state with certainty when an element is present leading to false positives in which the filter indicates an element is present when in fact it is not. To address the false positive rate and accuracy, the enhanced filter can be multileveled as well as multidimensional. More specifically, in addition to encoding a representation of a data element in a data structure, multiple modifications of the data element can be encoded. Further, a query can involve not only a queried data element itself but also multiple modifications of the data element, which will reduce the false positive rate and improve filter accuracy. Further yet, the data structure can be multidimensional, which can further reduce hashing collisions that result in false positives. A customer and bank can employ the enhanced filter system 104 in many scenarios to determine the presence or absence of an element without having to access elements of a data store.

A customer by way of customer device 102 can provide input to the enhanced filter system 104. By way of example, the customer can input a proposed username for access to online or mobile banking services provided by the bank server 100. The bank server 100 can store a large number of usernames that are reserved or in use by others. Rather than searching through all usernames in a data store to determine whether the proposed username is available, the enhanced filter system 104 can be employed to determine whether or not the username is present or absent from the data store. If absent, the username can be allowed. If present, the username can be denied. A password can also be required in conjunction with the username for authentication. The bank server 100 can have a list that identifies numerous passwords that are weak and not allowed. Again, rather than searching through all the weak passwords and comparing each with an entered password, the enhanced filter system 104 can be employed to determine whether the entered password is present or absent from a weak password list.

The bank server 100 can also employ the enhanced filter system 104 to aid in its own operations. As one example, the bank server 100 may be involved in providing product or service suggestions in conjunction with online or mobile banking. A list of products and services that have been suggested to a customer can be maintained and the enhanced filter system 104 can be employed to determine whether or not a product or service was previously suggested to the customer. In another instance, the bank server 100 can maintain a list of web addresses that are blocked from access by bank computers. In this situation, the blocked list can be encoded with the enhanced filter system 104. Subsequently, requests for access to websites can be allowed or denied based on a determination by the enhanced filter system 104 that a requested web address is present or absent from the blocked list. Further, the enhanced filter system 104 can be employed with respect to access to substantially any bank data store to determine whether a data element is present or absent prior to initiating a search or retrieval operation.

Figure 2:
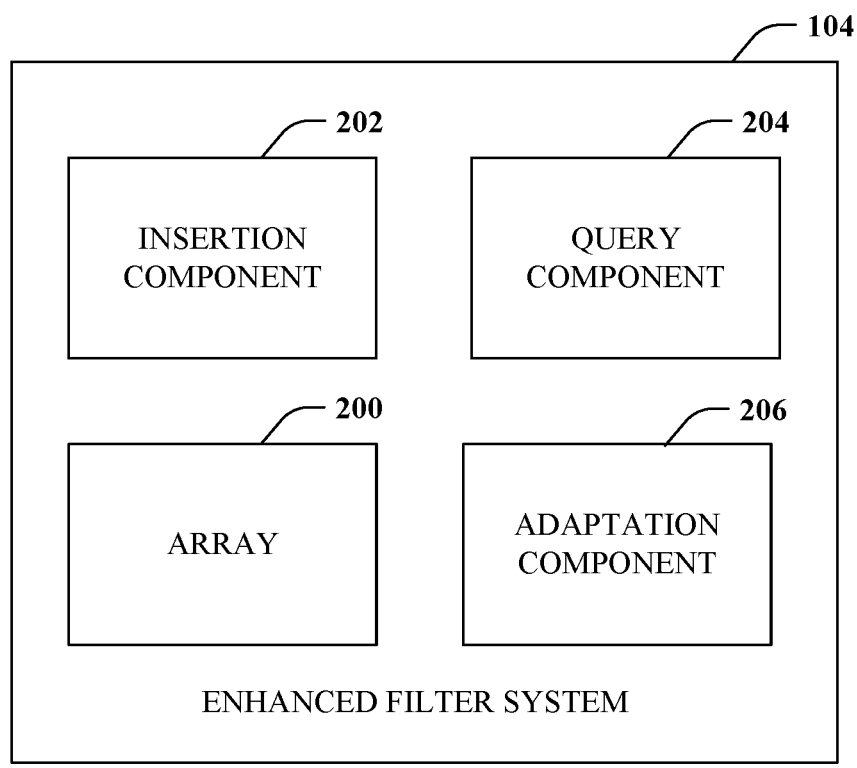
FIG. 2 is a block diagram of an enhanced filter system.

FIG. 2 depicts an example enhanced filter system 104 in further detail. As shown, the enhanced filter system 104 includes array 200, insertion component 202, query component 204 and adaptation component 206. The array 200 is a data structure over which the insertion component 202 and query component 204 can operate. The adaption component 206 is configured to modify operation of one or more of the insertion component 202 and the query component 204 based on context. Functionality of the insertion component 202, query component 204, and adaptation component 206 can be implemented by a processor coupled to a memory that stores instructions that, when executed, cause the processor to perform the functionality of each component.

The array 200 comprises a number of data values or elements typically of the same type in which each element is identified by at least one array index. More particularly, the array 200 is a data structure utilized to store representations of data elements that reside in a data store. In accordance with one embodiment, the array can be a bit array in which each element is represented as a binary choice such as one or zero or true or false. Here, the bit array can represent present or absent with respect to a corresponding data set. In addition, the array 200 can be a single or multidimensional array. The simplest form is a linear or one-dimensional array. A two-dimensional array is conceptually a table or matrix, and a three-dimensional array can be viewed as a cube. Of course, there can also by higher dimensional arrays that are more difficult to map to a visual concept.

The insertion component 202 is configured to save representations of data to the array 200. The insertion component 202 acquires data from a data source and saves a representation the data, as opposed to the data itself, in the array 200, which provides a security benefit. For example, one or more hash functions can be applied to data to produce a hash value, or more simply a hash. The hash can be utilized to identify a location in the array 200 as an array index, and at that location a value can be set. For example, in a bit in the array 200 can be set to a one to capture the data. Moreover, a predetermined modification can be applied at multiple subsequent levels prior to computing a hash to reduce a false positive rate. The additional levels and modifications reduce hashing collisions that would otherwise occur and produce false positive results. Alternate approaches can be to increase the number of hash functions or the size of the array 200 to reduce hashing collisions. However, the alternative approaches can increase processing time and memory utilization and are thus quite inefficient compared to the disclosed approach.

Figure 3:
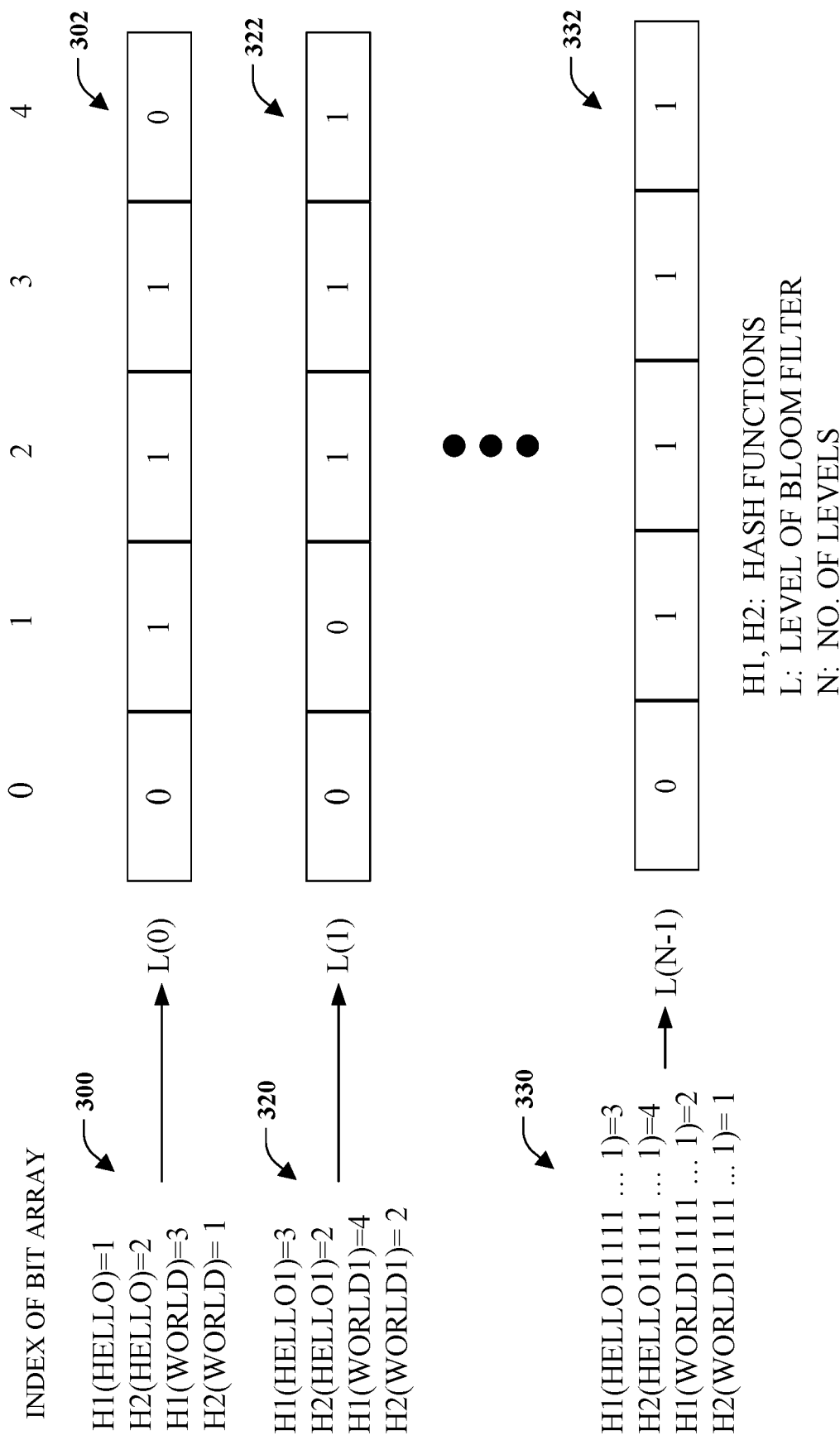
FIG. 3 depicts an example insertion operation.

Turning attention to FIG. 3, an example insertion operation is illustrated to facilitate clarity and understanding, and not to limit the scope of the subject disclosure. In accordance with an aspect of this disclosure, a multidimensional array, such as three dimensional array, or Bloom filter can be employed. Nevertheless, the example insertion operation is shown and described with respect to a small one-dimensional array for each level, resulting in a two-dimensional array overall, for ease of understanding.

In this example, the words "HELLO" and "WORLD" are inserted into the filter. In other words, a representation of the words is saved in an array. At 300, the words are subject to two hash functions "H1" and "H2." Executing the first hash function "H1" on "HELLO" and "WORLD" returns "1" and "3," respectively, while executing the second hash "H2" over the same words returns "2" and "1." The result is the set of numbers "(1, 1, 2, 3)." These hashes, or hash values, are utilized to identify portions of an array by index. At each index location, a value can be set to encode the words. At 302, a bit array is shown with bits at indices "1," "2," and "3" set from an initial value of "0" to "1." If a value at the location is already set, the value remains set. Thus, the two number ones result in the bit at index one being set. This represents a first level or layer of insertion, namely "L(0)."

At the next level, "L(1)," the words are subject to modification, such as a string manipulation operation. Here, the string manipulation operation corresponds to concatenation of a number one to the end of each word. Accordingly, "HELLO" becomes "HELLO1," and "WORLD" becomes "WORLD1." At 320, both hash functions "H1" and "H2" are invoked with the modified words as input and produce the set of values "(2, 2, 3, 4)." Using these numbers as indices, the corresponding values are set to "1" in an array as depicted at 322.

The number of levels "N" can be predetermined based on known or expected results with respect to a false positive rate. The final level is shown as "(L(N−1))." In this level, another number one is concatenated to the word of the immediately prior level. These modified words are again hashed by hash functions "H1" and "H2" resulting in the set of values "(1, 2, 3, 4)." Using these values as array indices, each array location is set as shown at 332.

The insert operation can be appreciated further with respect to the following pseudocode.

procedure INSERT
       levels<-number of levels of Bloom Filter
       i<-current level
       input<-user input
    Start INSERT
    For i=0 to levels−1
       input<-modify the input
       insert input to level i of Bloom Filter
    End INSERT Returning to FIG. 2, the query component 204 is configured to determine whether an element is present or absent from a data store based on the array 200. The query component 204 can receive input, hash the input, and check the array 200 to determine if bits are set or not at each array index specified by one or more hashes associated with one or more hash functions executed over the input. As described with respect to the insertion component 202, each time an item is inserted into the array 200 it can be modified at each level and bits set based on hashes produced by a number of hash functions. When the query component 204 performs a lookup, the query component 204 can return "present" only if all the levels return as "true." Stated differently, if the input as well as the modified input is determined present at each respective level, the query component 204 can return "present" for the input overall. If any level returns "false," the query component 204 will return "absent" and stop. By encoding and querying at multiple levels with modifications, the collision probability with respect to mapping with hash functions can be reduced, which will reduce the false positive probability and improve accuracy.

Figure 4:
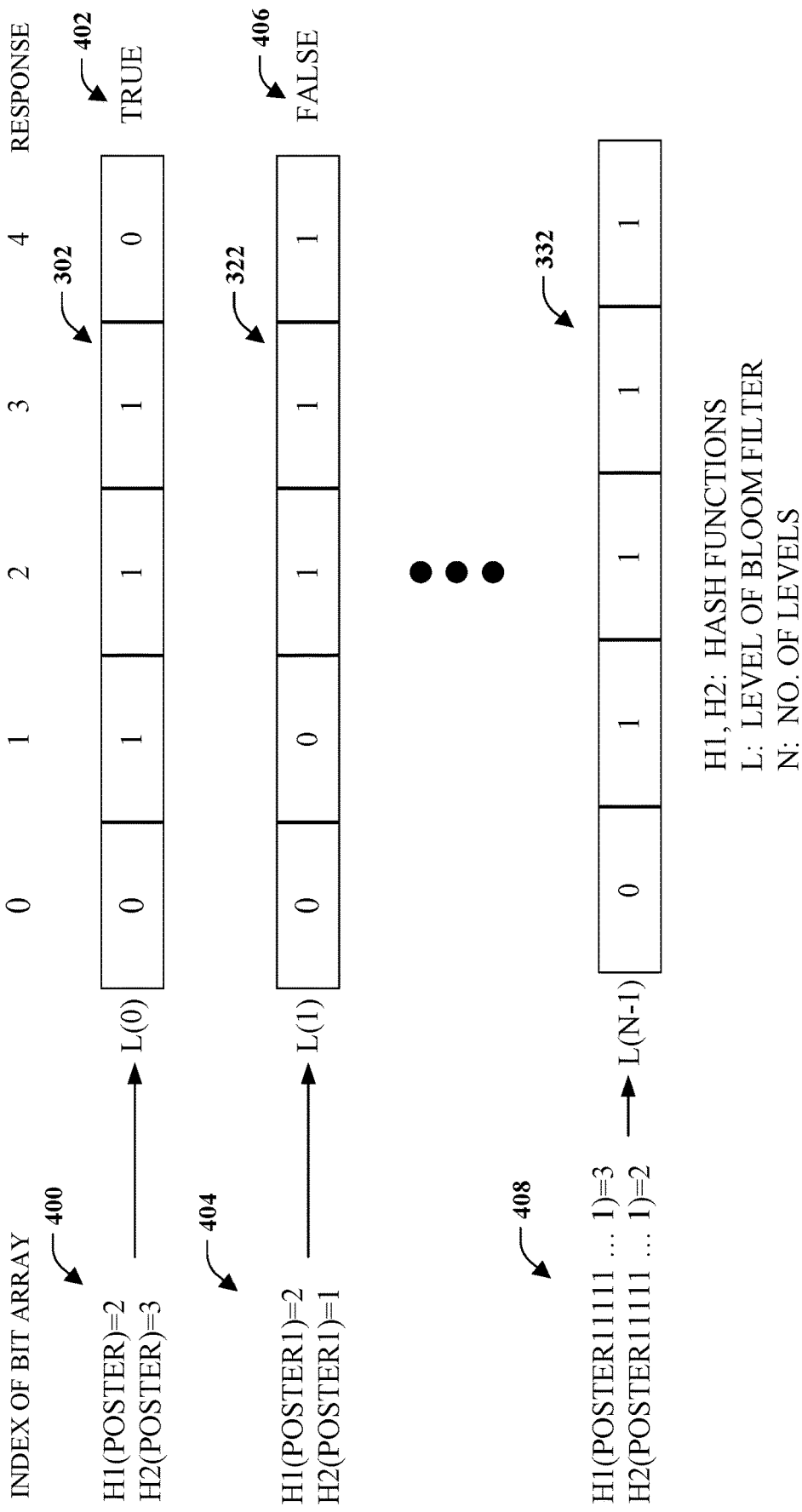
FIG. 4 depicts an example query operation.

Turning attention to FIG. 4, an example query operation that can be performed by the query component 204 is illustrated to provide further clarity and understanding. Three bit arrays are shown at 302, 322, and 332 that correspond to those produced with respect to inserting the words "HELLO" and "WORLD." These three bit arrays thus correspond to the current state of the array overall prior to the query operation.

Consider a scenario in which a query for the word "POSTER" is triggered. In response, at 400, the hash functions "H1" and "H2" can be applied to the input word "POSTER" and two values can be returned. In this case, the values are "2" and "3." A check is next made of the array at 302 to determine whether or not bits are set at the indexes of two and three. Here, the check returns true at 402 as the bits are in fact set. If the query operation were to stop at this point, the result would be a false positive, since the word "POSTER" would be deemed present in an array that comprises solely the words "HELLO" and "WORLD." However, processing continues at the next level if "true" is returned for the level in accordance with an aspect of this disclosure.

In this next level, namely "L(1)," a modification is made to the data in the previous level, which here is the original input "POSTER." The modification can correspond to a concatenation of a number one to the data. Accordingly, "POSTER" becomes "POSTER1" after the modification. Hashes are computed on this modified data by applying hash functions "H1" and "H2," at 404. The result is "2" for "H1" an "1" for "H2." Next, a determination is made as to whether bits with indices of one and two are set in array at 322. A lookup reveals that the bit at array index one is not set. As such, the response is false at 406. Since all bits at those indices were not set, the word is deemed absent from the data store. At this point, processing can stop and absent, or the like, can be the response to indicate the word is not present in the data store. With only one additional level and data modification, the correct response is provided rather than a false positive in this example.

The process can continue until a false response is returned or the process reaches the last level at 408. For example, if all responses are true including the last level, the response to the query can be present or the like to indicate the word is in the data store. While it is possible that this response is a false positive, the likelihood that it is a false positive is substantially reduced. The addition of multiple levels and manipulation of the input string at each level reduces the hashing collisions since it is less likely that the elements are hashed to common indices.

The query operation performed by the query component 204 can be further appreciated with respect to the following pseudocode.

```
procedure QUERY
    levels<-number of levels of Bloom Filter
    i<-current level
    input<-user input
    flag<-Boolean response by Bloom Filter for query
Start QUERY
    i<-initialize to zero
    top:
        If i>levels-1 goto check
        goto loop
    loop:
        input<-modify the input
        flag<-check if the modified input in level i
            <-of the Bloom Filter is present
        if flag is false, goto check
        i<-i+1
        goto top
    check:
        if flag is true, return element present
        if flag is false, return element absent
End QUERY
```

Returning to FIG. 2, the adaptation component 206 is configured to modify the insertion component 202, the query component 204, or both. The adaptation component 206 can receive, retrieve, or otherwise obtain or acquire contextual information. The contextual information can be associated with a data store associated with the array and the use or application of the data store in a broader process. In certain circumstances, the accuracy or rate of false positives may be a primary concern while in other cases in may not be important at all or secondary to other concerns (e.g., processing speed). The adaptation component 206 can be invoked at least initially to aid generation of the array and the insertion process of insertion component 202. More particularly, the context information can be employed to determine or infer and suggest parameters such as the number of levels to employ and the complexity of a modification. For example, such a determination can be made based on comparison of prior parameters and circumstances. By modifying the insertion process, the query process can also be affected as the query process depends on how elements are stored during the insertion process. Further, prior to a query, context information can be utilized as a basis for altering the number of levels utilized. For example, if it can be determined or inferred that accuracy is not as important as speed of completion, the number of levels that will be analyzed can be reduced from the maximum to a lesser number. Further, the number of levels can be associated with a range of accuracy desired.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. By way of example, and not limitation, the adaptation component 206 can employ such mechanism to determine, infer, or predict insertion and query operation parameters based on surrounding contextual data including, among other things, field of use. Furthermore, the subject enhanced filter system 104 is probabilistic and thus can be employed to aid artificial intelligence and machine learning.

In view of the example systems described above methods that may be implemented in accordance with the disclosed subject matter will be better appreciated with reference to flow chart diagrams of FIGS. 5-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 5:
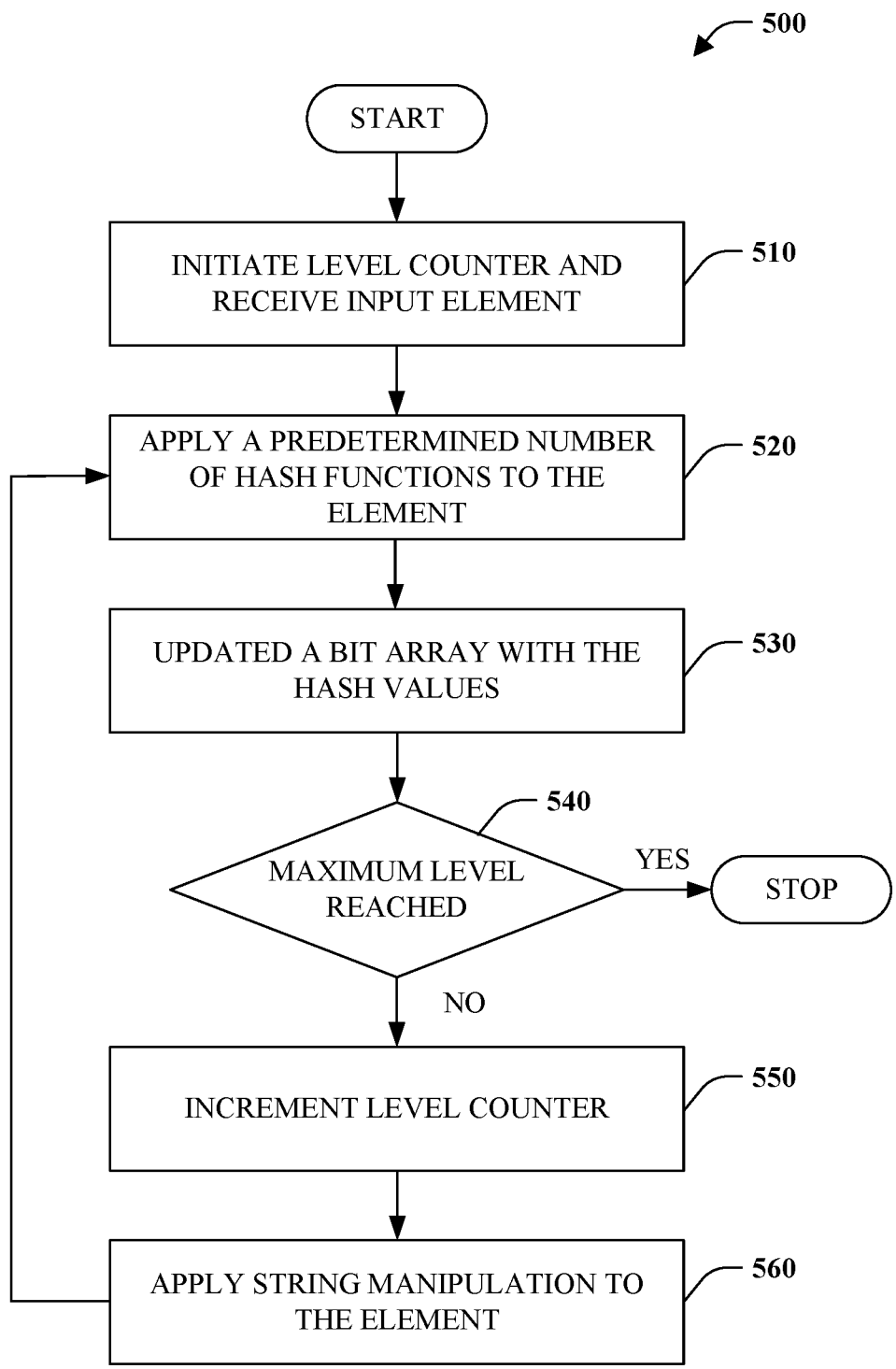
FIG. 5 is a flow chart diagram of a method of inserting a data element.

FIG. 5 illustrates a method 500 of inserting elements into a data structure such as a bit array. The method 500 can be performed by the enhanced filter system 104 and the insertion component 202 in particular.

At numeral 510, an input element is received, and a level counter is initiated. The input element can be data stored in a data store, which is to be inserted into a filter data structure. The level counter is a variable that captures the current level. After receiving the input element, the level counter is initiated to the first level and the method 500 continues at 520.

At 520, a predetermined number of hash functions are invoked on the input element. A hash function receives input of arbitrary size and maps to a value of fixed size known as a hash value or simply a hash. The number of hash functions can be predetermined based the use case and effectiveness in reduction of a rate of false positive.

At reference numeral 530, a bit array is updated with the hash values. The bit array is a data structure that stores a sequence of bits that represent a binary choice between present or absent. The bits are addressable by way of an array index. In this situation, a hash value identifies an array index. At each array index specified by a hash value, the bit is set. Initially all bits can be set to zero, and setting a bit corresponds to assigning the bit from a zero to a one. In an example scenario in which two hash functions are employed, resulting in two hash values, two bits can be set to one.

At numeral 540, a determination is made as to whether a maximum level has been reached or not. A predetermined number of levels can be set prior to initiating insertion. The number of levels can be determined based on a variety of factors associated with a degree of accuracy required for a given scenario, among other things. The predetermined maximum number of levels can be compared with a level counter to determine whether the maximum level has been reached. If the maximum level has been reached ("YES"), the method 500 can simply terminate. If the maximum level has not been reached ("NO"), the method 500 can continue at 550 where the level counter is incremented and then proceed to reference numeral 560.

At reference numeral 560, the element can be modified. For instance, a string manipulation operation can be applied such as concatenate a number one to the end of the element. Accordingly, if the element is the word "Hello," the modified element would be "Hello1." If the element is "Hello1" after a previous modification, the modified element would be "Hello1 1," and so forth. Another modification can be to shift the element by a set number of bits such that "Hello" becomes "olHel," for example. Of course, other modifications are possible and contemplated. The modification can be predetermined, for example based on experimental results with respect to a particular data set. After the modification is applied, the method 500 continues at 520 where the modified element is subject to a predetermined number of hash functions. The method 500 can then continue to loop, or iterate, until the maximum level is reached.

Figure 6:
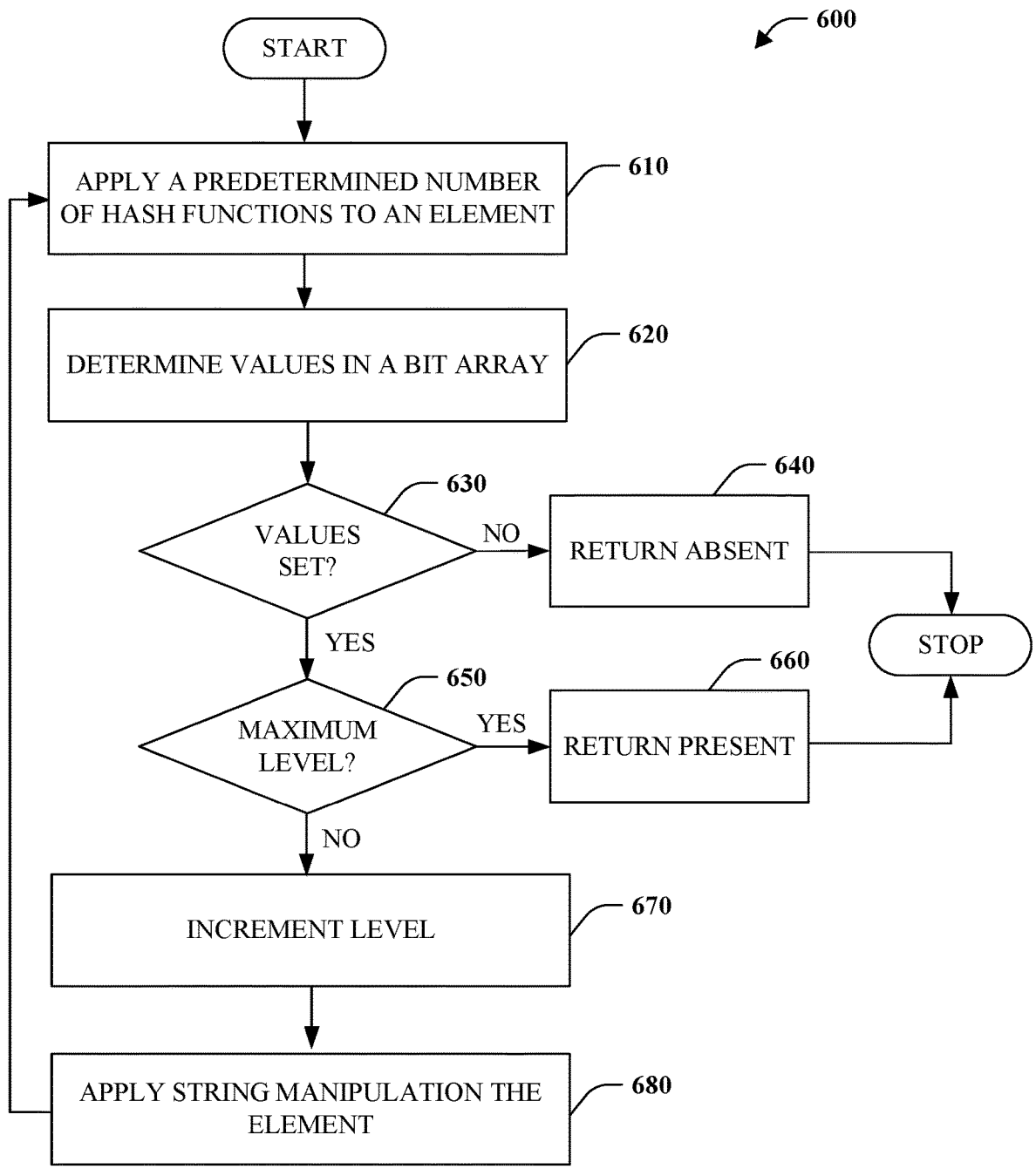
FIG. 6 is a flow chart diagram of a method of querying a data structure.

FIG. 6 depicts a method 600 of querying a data structure. The method can be performed by the enhanced filter system 104 and more specifically the query component 204. At numeral 610, a predetermined number of hash functions are applied to an input element that is the subject of the query. In other words, in response to receipt of an element a predetermined number of hash functions are executed with the element as a parameter. The result is a set of values from the predetermined number of hash functions.

At reference 620, values in a bit array are determined. More specifically, the values at array indices that correspond to the hash values are determined. The values can be either set or unset. For example, values of the bit array can be set to an initial value, such as zero. If the value is one as opposed to zero, the value can be deemed set. Alternatively, if the value is zero, the value can be said to be unset. In an alternative embodiment, the opposite can also be performed in which the values are initially one and are zero when set.

At numeral 630, a determination is made as to whether or not the values are set. A value can be set during an insertion operation to encode the presence of an element. Otherwise, the value can be unset. If at numeral 630 it is determined that one or more values are unset ("NO"), the method continues at 640, where 'ABSENT," or the like, is returned to indicate the element is not present and the method 600 terminates. By contrast, if at numeral 630, it is determined that all values are set ("YES"), the method 600 continues to numeral 650.

At numeral 650, another determination is made as to whether or not a maximum level has been reached. In accordance with an aspect of this disclosure, element insertion can be performed utilizing a predetermined number of levels. These levels can be evaluated during querying to decide as to whether an element is present or absent. The maximum can correspond to the predetermined number of levels employed during element insertion or potentially a lesser value. If the maximum level has been reached ("YES"), the method 600 returns present at 660 and terminates. If the maximum level has not been reached ("NO"), the method 600 continues at 670, where the current level is incremented by one, and then to numeral 680.

At numeral 680, the current element is modified, for example by applying a string manipulation operation to the element. The modification can be predetermined based on the modification utilized with respect to element insertion. In one instance, the modification can be a simple string manipulation such as concatenating a number one to the end of the element. Subsequently, the method 600 continues at 610, where one or more predetermined hash functions are applied to the modified element.

Figure 7:
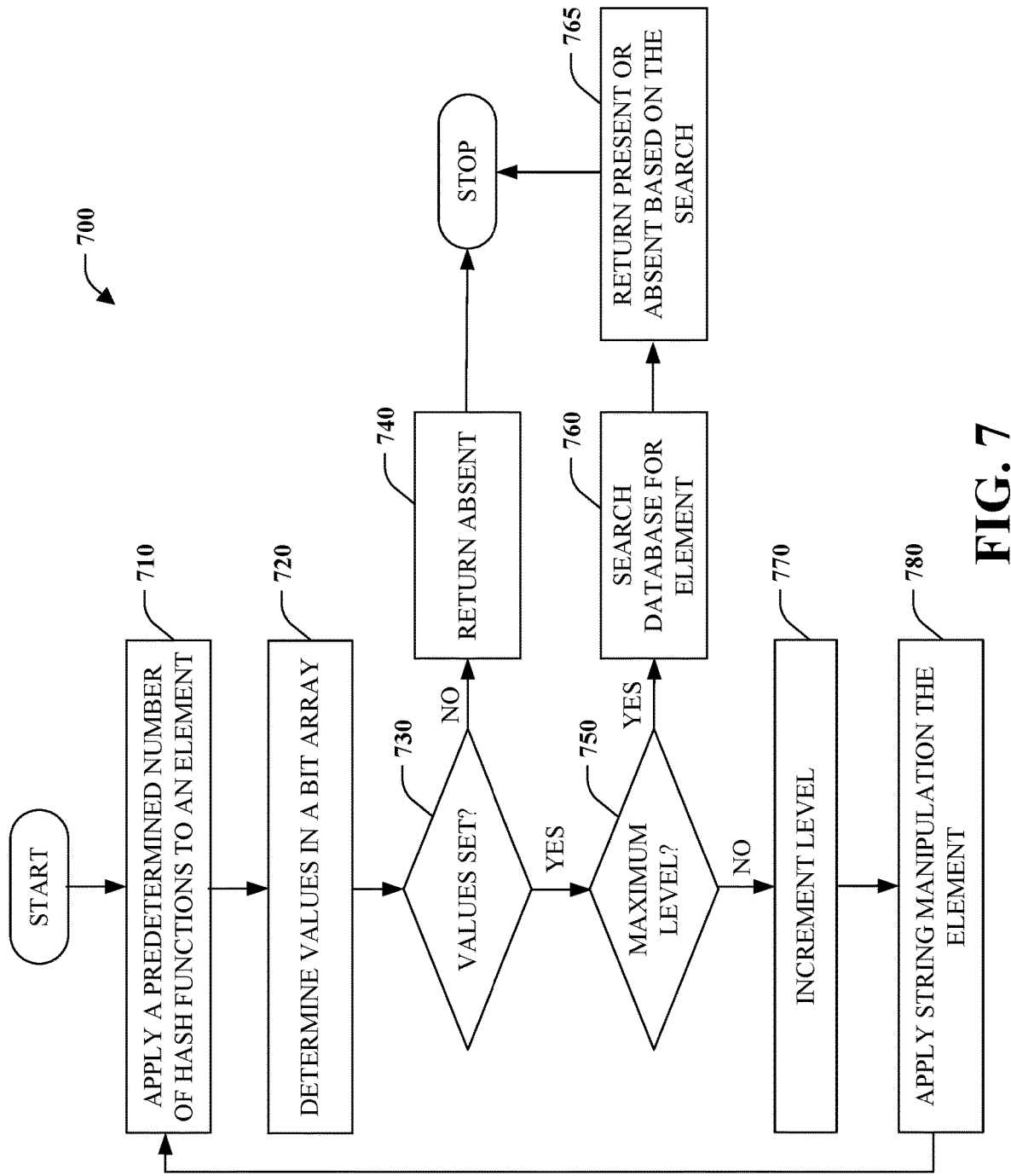
FIG. 7 is a flow chart diagram of a query operation method.

FIG. 7 is a flow chart diagram of a query operation method 700. The method 700 can be performed by the enhanced filter system 104 and more particularly the query component 204.

At numeral 710, a predetermined number of hash functions are applied to an input element that is the subject of the query. Stated differently, in response to receipt of an element a predetermined number of hash functions are invoked and executed with the element as a parameter. The result is a set of values from the predetermined number of hash functions.

At reference 720, values in a bit array are determined. Values at array indices specified by the hash values are determined. The values can be either set or unset. For example, values of the bit array can be set to an initial value, such as zero. If the value is one as opposed to zero, the value can be said to be set. Alternatively, if the value is zero, the value can be deemed unset or not set.

At numeral 730, a determination is made as to whether or not the values are set. A value can be set during an insertion operation to encode the presence of an element. Otherwise, the value can be unset. If at numeral 730 it is determined that one or more values are unset ("NO"), the method continues at 740, where "ABSENT," or the like, is returned to denote the element is not present and the method 700 terminates. By contrast, if at numeral 730, it is determined that all values are set ("YES"), the method 700 continues to numeral 750.

At numeral 750, another determination is made as to whether or not a maximum level has been reached. In accordance with an aspect of this disclosure, element insertion can be performed utilizing a predetermined number of levels. These levels can be evaluated during querying to decide as to whether an element is present or absent. The maximum can correspond to the predetermined number of levels employed during element insertion or potentially a lesser value. If the maximum level has been reached ("YES"), the method 700 continues at 760.

At numeral 760, a search for the element can be initiated on a database. The database can correspond to a data store whose contents are encoded in a data structure such as a bit array. Rather than simply returning a response identifying the element as present, the method 700 can trigger the database search to ensure an accurate result. At 765, the result of the database search can be returned. More particularly, "PRESENT," "ABSENT," or the like, be returned based on the search results. Subsequently the method 700 can terminate.

If, at 750, the maximum level has not been reached ("NO"), the method 700 continues at 770, where the current level counter is incremented by one. Subsequently, the method 700 continues to numeral 780.

At numeral 780, the current element is modified, for example by applying a string manipulation operation to the element. The modification can be predetermined based on the modification utilized with respect to element insertion. In one instance, the modification can be a simple string manipulation such as concatenating a number one to the end of the element. Subsequently, the method 700 continues at 710, where one or more predetermined hash functions are applied to the modified element.

Figure 8:
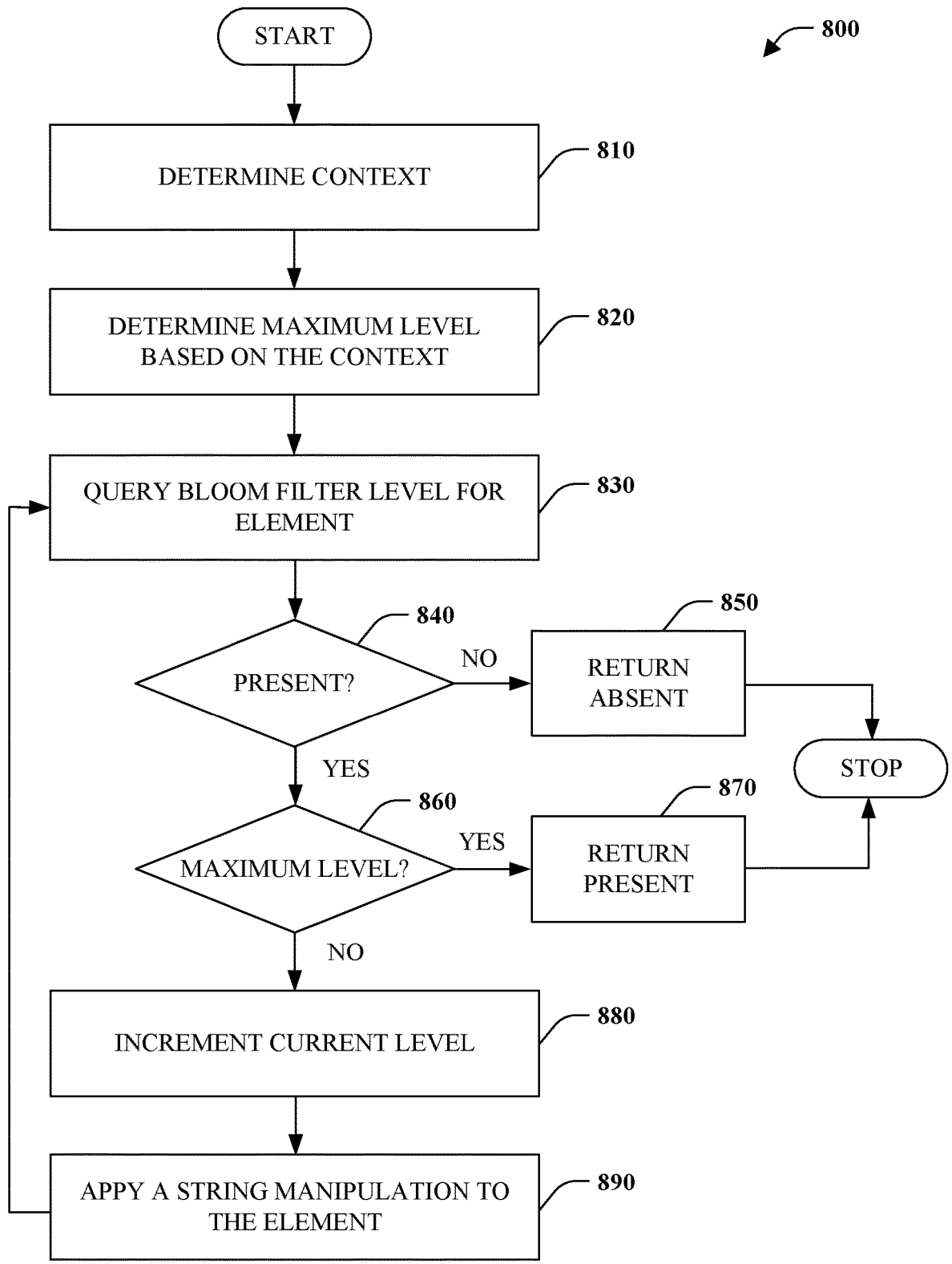
FIG. 8 is a flow chart diagram of a query operation method.

FIG. 8 illustrates a query operation method 800. The method 800 can be performed by the enhanced filter system 104 and more particularly the query component 204 and the adaptation component 206.

At numeral 810, context is determined. Context can be determined base on input from one or more sources of context data or information. For example, the context can correspond to information regarding the data store for which data is encoded, use of the data store, and the computer or user who submitted the query. The context can correspond to current or historical information. From contextual or other information received from one or more sources context can be determined. In one instance, context classes can be predefined, and the determination can identify a particular class based on the contextual information available.

At numeral 820, a maximum level can be determined based on the context. A maximum level can correspond to a maximum number of levels to evaluate when performing a membership query. For example, if the context indicates that accuracy is of utmost importance, the maximum number of levels can be more than it would be if speed of response is the most important factor. Accordingly, the number of levels can be set to the maximum allowed based on the maximum levels specified with insertion of data elements. In the case where context indicates that speed is important, the context can reduce the accuracy to increase the speed by specifying a maximum number of levels that is less than that which is enabled.

At numeral 830, a Bloom filter (BF) is queried for the element. A BF stores values in a bit array that encode the presence of element inserted into the array. A query can involve executing a number of hash functions over an element, which returns hash values, or simply hashes. The hashes are utilized to specify indices with the array. Values located at the corresponding index can be returned and analyzed. If one or more values are unset, it is certain that the element is absent from a corresponding data store. By contrast, if all values are set, it is possible that the element is present in the data set. It is noted that the BF operates over the element and a particular level from amongst a plurality of levels.

At 840 a determination is made as to whether or not the element is present or not. More specifically, the determination concerns a result of the BF query. If the element is not present ("NO"), the method 800 proceeds to return "ABSENT," or corresponding representation thereof, at 850, and subsequently terminate. If the element is deemed present ("YES"), the method proceeds to reference numeral 860.

At reference numeral 860, a determination is made as to whether or not a maximum level has been reached. The maximum level refers to the maximum number of levels determined at 820. The determination can be made by comparing a current level variable to the maximum number of levels. If the maximum level has been reached ("YES"), the method 800 proceeds to return "PRESENT," or corresponding representation thereof, and terminate. Alternatively, if the maximum level has not been reached ("NO"), the method 800 proceeds first to numeral 880, where the current level counter is incremented by one, and then to numeral 890.

At numeral 890, a string manipulation is applied to the element. For example, the element can be concatenated with a number such as one. As another example, the string manipulation can reverse alphanumeric terms in the element. The string manipulation can be predetermined base on the string manipulation utilized to encode or insert elements into the BF. After the manipulation is applied, the method 800 continues to 830, where the BF is queried at the current level for the manipulated element. The method 800 continues until it can be determined that the element is absent, or the maximum level is reached.

Figure 9:
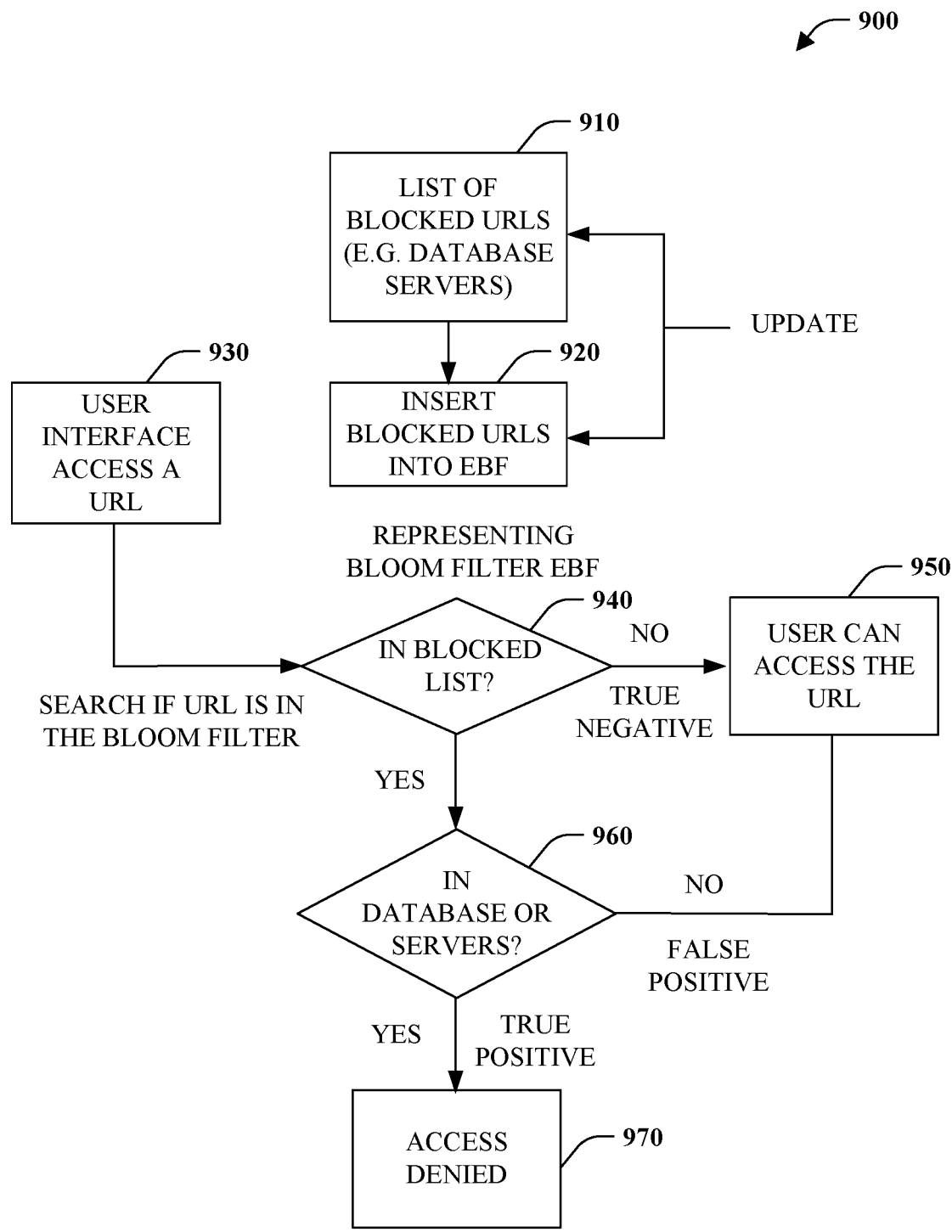
FIG. 9 is a flow chart diagram of an example scenario.

FIG. 9 illustrates a flow chart diagram of a method 900 associated with a sample scenario to facilitate further clarity and understanding. The method 900 can be performed by the enhanced filter system 104 and various components thereof. The scenario involves determining whether or not to allow access to a uniform resource locator (URL) based on a set of blocked URLS.

At 910, a list of blocked URLs is received from a data store such as a database or server. At numeral 920, the blocked URLs are inserted into an enhanced Bloom filter (EBF). The insertion can be performed at multiple levels with URL modification. The EBF can correspond to a multidimensional and multilayered data structure such as an array. The list of blocked URLs can be monitored and updated as needed. As well, any additional URLs can be inserted into the EBF.

At numeral 930, access to a URL is sought by way of a user interface. For example, a URL can be specified by a user or otherwise selected within a web browser. In response, a EBF search is initiated to determine if the requested URL is in the list of blocked URLs. The search can involve performing operations iteratively for a predetermined number of iterations or until a URL is deemed absent, in which a modified URL acts as an initial URL for a next iteration. The operations can include determining two or more hashes of a URL with different hash functions, looking up data values in an array with array indices specified by the two or more hashes, applying a predetermined modification to the URL producing the modified URL, classifying the URL as absent when any one of the data values is unset, and classifying the data element as present when all of the data values are set.

At numeral 940, a determination is made as to whether or not the URL is in the blocked list based on the EBF search. If the URL is not in the blocked list ("NO"), the process can proceed to allow a user to access the URL based on a true negative response. If the URL is deemed to be in the blocked list ("YES"), the process continues at numeral 960.

At numeral 960, a determination is made as to whether or not the URL is in a database or server where the list of blocked URLs resides. If it is not in a database or server ("NO"), the process proceeds to allow the user to access the URL based on a false positive determination. IF the URL is in the database or server ("YES"), the process denies access to the URL based on a true positive determination.

The subject disclosure pertains to the technical problem of performing membership queries with respect to data stored on databases or other data stores. The problem is addressed technically by way of an enhanced probabilistic filter. Rather than saving data itself, a representation or encoding of data present on a data store can be saved in a data structure such as an array. As described herein, a predetermined number of hash functions can be invoked to produce hashes that identify array indices. Values at corresponding indices can be set to encode the presence of data. Subsequently, queries can be processed by invoking the predetermined number of hash functions to produce hashes and looking up whether values are set at all or less than all indices specified by the hashes. Moreover, multiple levels are disclosed in which elements are modified at subsequent levels. In this manner, hashing collisions are reduced thus reducing false positive probability and improving accuracy. Further, the array that stores the encoding be multidimensional to further enhance accuracy.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
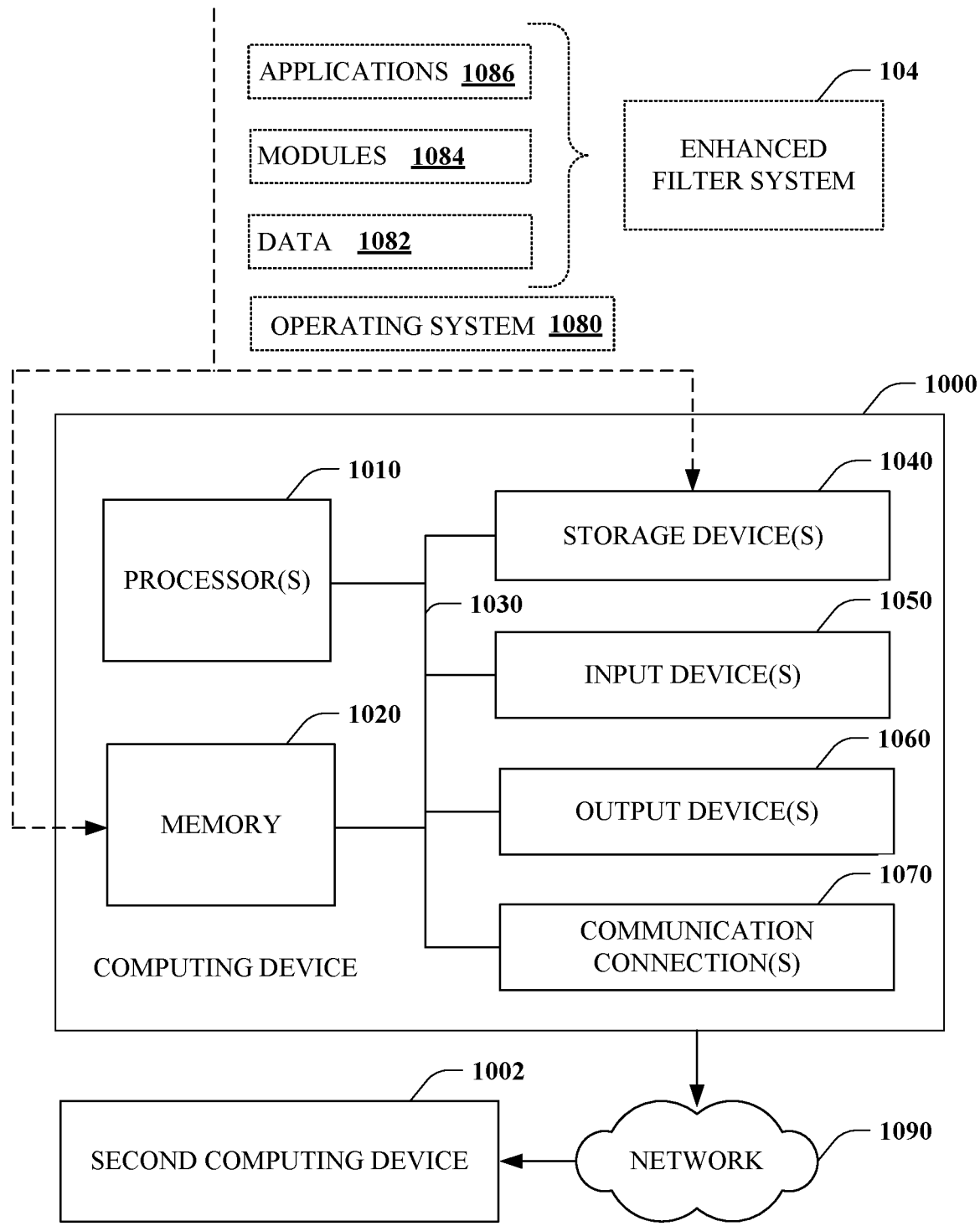
FIG. 10 is a schematic block diagram illustrating a suitable operating environment for aspects of the subject disclosure.

To provide a context for the disclosed subject matter, FIG. 10 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer executable actions, instructions, and or components stored in the memory 1020.

The processor(s) 1010 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations with respect to digital image processing and computer graphics.

The computing device 1000 can include or otherwise interact with a variety of computer-readable media to facilitate control of the computing device to implement one or more aspects of the disclosed subject matter. The computer-readable media can be any available media that is accessible to the computing device 1000 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the enhanced filter system 104 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the enhanced filter system 104 and/or functionality associated therewith can be embedded within hardware in an SOC architecture.

The input device(s) 1050 and output device(s) 1060 can be communicatively coupled to the computing device 1000. By way of example, the input device(s) 1050 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 by means of a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In one instance, the computing device 1000 can perform operations associated with the enhanced filter system 104 and the second computing device 1002 can correspond to a database or server on which the data encoded by the enhanced filter is stored.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
 a processor coupled to a memory that includes instructions that, when executed by the processor, cause the processor to:
  receive a request to access a URL;
  determine a search accuracy and a search speed based on historical information associated with a user requesting access;
  determine a number of levels of a Bloom filter based on the search accuracy and the search speed;
  input the URL into the Bloom filter;
  perform operations iteratively for the number of levels of the Bloom filter, the operations comprising:
   invoking a set number of hash functions with respect to a data element of the URL to produce a first hash of the data element, wherein at least two of the hash functions of the set number of has functions are different;
   setting a value in an array at a first index specified by the first hash;
   applying a predetermined modification to the data element to produce a modified element;
   invoking the set number of hash functions with respect to the modified element to produce a second hash of the modified element;
   setting a value in the array at a second index specified by the second hash; and
   classifying the URL as absent or present based on one or more values set in the array.

2. The system of claim 1, wherein the instructions further cause the processor to:
 apply the predetermined modification to the modified element to produce a second modified element;
 invoke the set number of hash functions with respect to the second modified element to produce a third hash of the second modified element; and
 set a value in the array at a third index specified by the third hash.

3. The system of claim 1, wherein the instructions further cause the processor to determine whether an input element is present or absent from a data store based on one or more values set in the array.

4. The system of claim 3, wherein the instructions further cause the processor to:
 invoke the set number of hash functions with respect to the input element to produce a third hash;
 look up a value in the array with the third hash, wherein the third hash corresponds to an index and the value is either set or unset; and
 determine that the input element is absent from the data store when the value is unset.

5. The system of claim 4, wherein the instructions further cause the processor to:
 apply the predetermined modification to the input element to produce a modified input element when the value is set;
 evaluate the set number of hash functions with respect to the modified input element to produce a fourth hash;
 look up a value in the array with the fourth hash, wherein the fourth hash corresponds to an index and the value is either set or unset; and
 determine the input element is absent from the data store when the value is unset.

6. The system of claim 5, wherein the instructions further cause the processor to determine the input element is present in the data store when the value is set.

7. The system of claim 1, wherein the array is a multidimensional array.

8. The system of claim 1, wherein the predetermined modification is a string manipulation operation.

9. The system of claim 8, wherein the string manipulation operation is concatenation of an alphanumeric character to the data element.

10. A method comprising:
 receiving a request to access a URL;
 determining a search accuracy and a search speed based on historical information associated with a user requesting access;
 determining a number of levels of a Bloom filter based on the search accuracy and the search speed;

inputting the URL into a Bloom filter;

performing operations iteratively for a predetermined number of iterations or until a data element of the URL is deemed absent, wherein a modified data element acts as an initial data element for a next iteration, the operations comprising:

determining a set number of hash functions based on the data element;

determining two or more hashes of the data element with the set number of hash functions, wherein at least two of the hash functions of the set number of has functions are different;

looking up data values in an array with array indices specified by the two or more hashes;

applying a predetermined modification to the data element producing the modified data element;

classifying the data element as absent when any one of the data values is unset; and classifying the data element as present when all of the data values are set; and returning a present or absent classification in response to receipt of the data element, wherein the classification pertains to whether the data element is present or absent from a data store of a financial institution.

11. The method of claim 10, further comprising receiving an account username as the data element.

12. The method of claim 11, further comprising adding the account username to the data store of the financial institution in response to return of an absent classification.

13. The method of claim 10, further comprising looking up the data values in a multidimensional array.

14. The method of claim 10, further comprising applying a string manipulation operation as the predetermined modification.

15. The method of claim 14, wherein the string manipulation operation is concatenation of an alphanumeric character to the data element.

16. The method of claim 10, further comprising setting the predetermined number of iterations based on context information regarding use of the classification.

17. The method of claim 10, further comprising searching the data store for the data element when, after the predetermined number of iterations, the data element is classified as present and returning the present or absent classification based on whether data store includes the data element.

18. A method comprising:

performing operations iteratively for a predetermined number of iterations wherein a modified data element acts as an initial data element for a next iteration, the operations comprising:

receiving a request to access a URL;

determining a search accuracy and a search speed based on historical information associated with a user requesting access;

determining a number of levels of a Bloom filter based on the search accuracy and the search speed;

inputting the URL into a Bloom filter;

determining a set number of hash functions based on a data element of the URL;

determining two or more hashes of a data element with the set number of hash functions, wherein the data element corresponds to a unit of data stored on a data store of a financial institution and wherein at least two of the hash functions of the set number of hash functions are different;

setting data values of a bit array utilizing the two or more hashes as array indices; and applying a predetermined modification to the data element to produce the modified data element.

19. The method of claim 18, further comprising setting the data values in a multidimensional bit array.

20. The method of claim 19, further comprising applying a string manipulation operation as the predetermined modification.

* * * * *

UNITED STATES PATENT AND TRADEMARK OFFICE
CERTIFICATE OF CORRECTION

| | |
|---|---|
| PATENT NO. | : 11,853,288 B1 |
| APPLICATION NO. | : 17/157113 |
| DATED | : December 26, 2023 |
| INVENTOR(S) | : Asha Rani Gogoi |

It is certified that error appears in the above-identified patent and that said Letters Patent is hereby corrected as shown below:

In the Claims

Column 18, Line 2, Claim 1, replace "the hash functions of the set number of has func-" with -- the hash functions of the set number of hash func- --.

Column 19, Line 13, Claim 10, replace "has functions are different;" with -- hash functions are different; --.

Signed and Sealed this
Thirteenth Day of February, 2024

Katherine Kelly Vidal
*Director of the United States Patent and Trademark Office*